United States Patent
Geyer

[11] 3,888,469
[45] June 10, 1975

[54] EXTRUSION MILL
[75] Inventor: Paul Geyer, Detroit, Mich.
[73] Assignee: Uniroyal, Inc., New York, N.Y.
[22] Filed: Feb. 5, 1974
[21] Appl. No.: 439,776

[52] U.S. Cl. .............................. 259/191; 425/208
[51] Int. Cl. ............................................ B29b 1/06
[58] Field of Search ......... 259/191, 192, 193, 9, 10, 259/97, 25, 26, 45, 46; 425/207, 208; 100/145, 146

[56] References Cited
UNITED STATES PATENTS

| 3,310,836 | 3/1967 | Nichols | 259/191 |
| 3,375,549 | 4/1968 | Geyer | 259/192 |
| 3,650,652 | 3/1972 | Dray | 425/208 |
| 3,671,021 | 6/1972 | Pomper | 259/191 |

Primary Examiner—Robert W. Jenkins
Attorney, Agent, or Firm—Philip Sands, Esq.

[57] ABSTRACT

An extrusion mill having a barrel in which a worm is rotatably supported, the worm having helical threads and grooves which alternate with one another and are adapted to mix and advance elastomeric stock in the barrel. The threads have crests which define a helical venting path along which fluid collected from the elastomeric stock in the barrel may be vented-to-atmosphere. The foregoing abstract is neither intended to define the invention disclosed, nor is it intended to limit the scope of the invention in any way.

9 Claims, 4 Drawing Figures

EXTRUSION MILL

BACKGROUND OF THE INVENTION

The present invention relates generally to an extrusion mill, of the barrel-and-rotary worm type, and more particularly to means for deaerating and venting-to-atmosphere fluid collected in the barrel from elastomeric stock mixed by the worm.

Mills for mixing and extruding elastomeric stock, natural or synthetic, such as crumb-rubber or the like, generally comprise a tube or barrel in which is mounted a rotary worm or screw. A hopper or other means is provided for introducing elastomeric stock into the barrel, the stock then being subjected to extensive shearing action by the rotary worm and subsequently discharged from the barrel.

Efforts have been made to design the worm or screw for optimizing its capacity to mix and shear elastomeric stock, and effect a breakdown of the smaller harder particles of the stock so as to more uniformly blend the latter. Such efforts have resulted in extrusion mills of the type, for example, disclosed in U.S. Pat. No. 3,375,549, issued on Apr. 2, 1968 to P. Geyer, the subject matter of which is incorporated herein by reference.

In the disclosure of U.S. Pat. No. 3,375,549, the threads of the worm are provided with respective conformingly helical grooves, in the crest portions thereof, which in succession downstream of the barrel bore increase in depth and axial extent. These grooves as a group overlap a corresponding group of grooves defined between the threads which in succession downstream of the barrel bore decrease in axial extent and depth. The group of grooves in the crests of the threads and the group of grooves defined between the threads effectively cooperate with one another to enhance and optimize the degree of shearing action to which the elastomeric stock is subjected while advanced by the worm.

The aforementioned patent, thus, discloses an extrusion mill which is quite effective for optimizing the shearing action to which the elastomeric stock is subjected by the worm, but has a disadvantage in that there is not provided an effective means for deaerating and venting-to-atmosphere fluid collected in the barrel from the mixed elastomeric stock, the fluid entrapped in the stock acting as a cushion and reducing the extent of shearing action to which the stock may be subjected by the worm. The same disadvantage is true for other conventional mills.

Moreover, when air or other fluid is not removed from the elastomeric stock as it is extruded, an article into which the stock is formed subsequently may be porous and fail to present a desired degree of uniformity and consistency with corresponding articles formed from the elastomeric stock. Such articles, which present an immeasurable quantity of air, may, therefore, not have the desired dimensional characteristics and weight which is necessary for the particular use that the article is to be put to.

It is clear, therefore, that it is highly desirable and often necessary to evacuate fluid collected from the elastomeric stock from the barrel to insure that the elastomeric stock is subjected to the greatest possible degree of shearing action during mixing, and to insure that the ultimate product formed from the elastomeric stock is not unacceptably porous. Conventional extrusion mills, however, are not entirely effective in this matter.

SUMMARY OF THE INVENTION

Accordingly, it is an object of the present invention to provide means for deaerating and venting-to-atmosphere fluid collected in an extrusion mill from elastomeric stock mixed therein.

It is another object of the present invention to provide such means which effectively vents fluid collected from the elastomeric stock in a direction opposite of the direction of advancement of the mixed elastomeric stock to, thereby, insure that the collected fluid does not discharge together with the elastomeric stock and impregnate the latter.

Further objects and advantages of this invention will become apparent as the following description proceeds.

Briefly stated, and in accordance with one embodiment of the present invention, the extrusion mill includes a barrel having an elongate bore in which is rotatably supported a threaded worm. The crest of each of the helical threads has a distal portion facing upstream of the bore which is formed with a correspondingly helical cut-out that defines together with the interior of the barrel a helical venting path along which fluid collected in the bore is vented-to-atmosphere in a direction opposite the direction along which the elastomeric stock is advanced by the worm.

In order to assist deaeration of the elastomeric stock, it is preferred to provide the worm with grooves each having a tapered bottom which deepens in a direction downstream of the bore, the shallow upstream region of each tapered bottom acting to compress and deaerate the elastomeric stock, the deeper downstream region of each tapered bottom permitting fluid deaerated from the elastomeric stock to advance slightly downstream to the helical venting path.

BRIEF DESCRIPTION OF THE DRAWINGS

While the specification concludes with claims particularly pointing out and distinctly claiming the subject matter regarded as the invention herein, it is believed that the invention will be better understood from the following description taken in conjunction with the accompanying drawings in which:

DETAILED DESCRIPTION OF THE INVENTION

Figure 1:
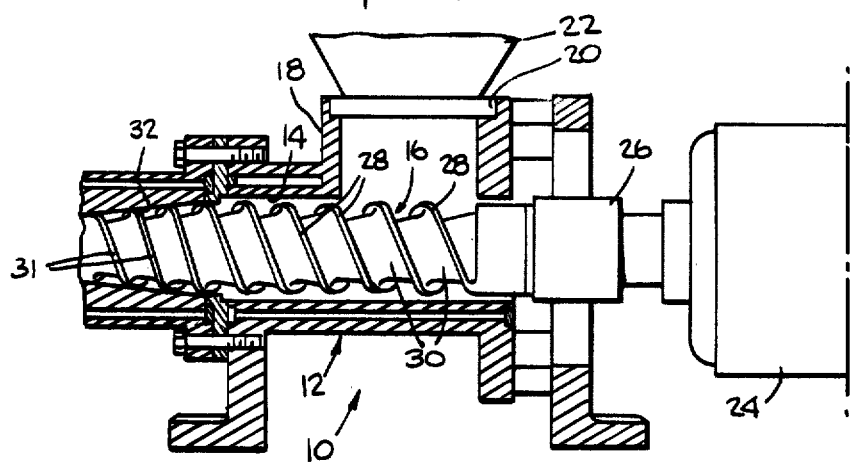
FIG. 1 is a fragmentary, axially taken, cross-sectional view illustrating a conventional mill having a worm as contemplated to be modified pursuant to the present invention.

Referring now to the drawings, and more particularly to FIG. 1, the present invention relates generally to a mill for extruding and mixing elastomeric stock. The mill is generally denoted by the reference character 10, and includes a barrel 12 defining an elongate bore 14 in which is rotatably mounted a threaded worm or screw 16. The barrel 12 is provided at one end with a generally vertically disposed input section 18 having an upper open end 20 which communicates with a hopper 22, the latter which functions to introduce elastomeric stock into the barrel 12.

The worm 16 is rotatably driven by means of a conventional motor 24 or the like through the intermediary of a conventional transmission or gear reduction assembly 26. The worm 16 is provided with threads 28 which define therebetween respective grooves 30. The threads 28 may all be of the same diameter over the entire axial extent of the worm 16 or, alternatively as illustrated, the threads 28 may run into a tapered threaded flight having threads 31 which gradually decrease in diameter, such as at the left region of FIG. 1. At this region, the bore corresponds in configuration to the threads 31 and presents a conforming frustoconical configuration which is denoted generally by the reference character 32.

Figure 2:
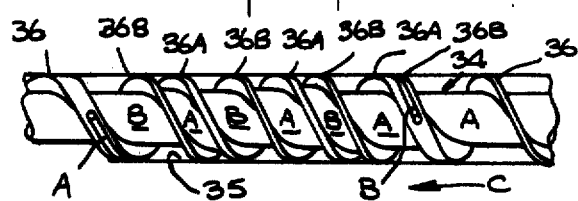
FIG. 2 is a fragmentary, schematic view of another type of conventional mill having a worm as contemplated to be modified pursuant to the present invention.

Alternatively, the worm may be of the type illustrated in FIG. 2 and denoted by the reference character 34. The worm 34 is of the kind described in the aforementioned U.S. Pat. No. 3,375,549, the subject matter of which is incorporated herein by reference. The worm 34 may be characterized as a "refiner" screw for optimizing a breakdown of the smaller and harder particles of the elastomeric stock and for separating the coarser harder particles from the mixed stock. Briefly, the worm 34 is provided with a group of grooves A which in succession gradually decrease in axial extent and depth in a direction downstream of a barrel 35 in which the worm 34 is confined, namely in the direction of arrow C, and with a group of threads 36 which act to define and separate the grooves A from one another. The crests of the threads 36 are medially provided with respective conformingly helical grooves B which in succession in a direction of arrow C gradually increase in axial extent and depth and divide each of the threads 36 into thread pairs 36A and 36B.

The grooves A in the worm 34 initiate with one having a maximum depth and axial extent and terminate in one having a substantially zero axial extent and depth. On the other hand, the grooves B in the crest of each of the threads 36 initiate with one having a substantially zero axial extent and depth and terminate with one of maximum axial extent and depth. The relationship of the grooves A in the worm 34 and the grooves B in the crest of each of the threads 36 is such that the group of grooves B in the crest of the threads 36 overlap the group of grooves A in the worm 34.

The continually changing depth and axial extent of the grooves A and B is effective to break down the coarser and harder enlarged particles in the elastomeric stock advanced by the worm 34. It will be understood that the barrel in which the worm 34 is confined preferably presents a bore of conforming cross-section (cylindrical) which cooperates with the threads 36 and the grooves A and B for mixing the elastomeric stock as it is advanced by the worm 34.

Figure 3:
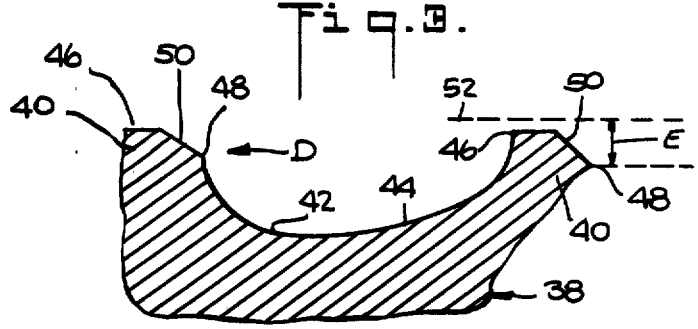
FIG. 3 is an enlarged, fragmentary, cross-sectional view of a pair of worm threads and a groove therebetween pursuant to one embodiment of the present invention.
Figure 4:
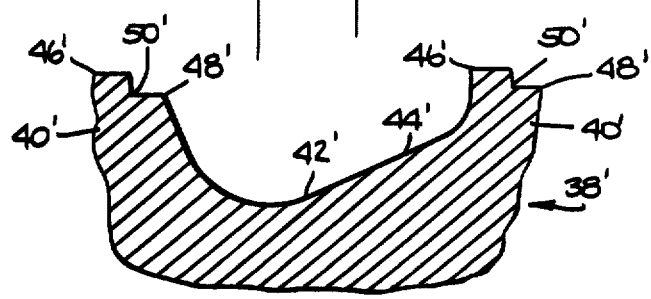
FIG. 4 is a view similar to FIG. 3, but illustrating an alternate embodiment of the present invention.

The nature of the present invention will be best understood by referring to FIGS. 3 and 4 wherein there are illustrated alternate embodiments pursuant to the present invention as may be utilized either with a worm of the type illustrated in FIG. 1 or alternatively with one of the type illustrated in FIG. 2. In FIG. 3 there is illustrated a worm in enlarged, fragmentary, axial cross-section, the worm denoted generally by the reference character 38. The worm 38 is provided with threads 40 (only two shown) which define therebetween grooves 42 (only one shown). Each groove 42 is provided with a tapered bottom which opens in a direction downstream of the bore in which the worm 38 is confined, namely, in the direction of arrow D.

The threads 40 at their upper free ends or at their respective crests are each provided with a frontal portion 46 and a distal portion 48. The distal portion 48 of each of the crests is formed with a cut-out in the form of a bevel 50 which is inclined at an angle in the range of approximately 10°–30° relative to the generally horizontally disposed flat upper crest portion between the frontal and distal crest portions 46 and 48. The axial extent of each of the bevels 50 is preferably in the range of approximately 0.25–0.50 times the thickness of the corresponding crests thereof measured axially of the worm 38.

The particular angle of the bevel 50 is chosen so that there is provided a preferred radial clearance between the extreme end of the distal portion 48 of each crest and the interior wall of a barrel in which the worm 38 is confined. The radial clearance is preferably at least 1.25 times greater than any clearance that may exist between the frontal portion 46 of each of the crests and the internal wall of the barrel in which the worm 38 is confined. For purposes of illustration only, the interior wall of the barrel in which the worm 38 is confined is denoted generally by the reference character 52 associated with a horizontal broken line, the maximum clearance between the distal portion 48 of each of the crests and the internal wall 52 being defined generally by the reference character E.

The alternate embodiment illustrated in FIG. 4 is denoted generally by the reference character 38' and is provided with parts which correspond to those parts of the worm 38 illustrated in FIG. 3. The corresponding worm parts have the same reference characters as those illustrated in FIG. 3, but are provided with primed (') indicia to distinguish them from those illustrated in FIG. 3. However, in the alternate embodiment of FIG. 4, the cut-out 50' is in the form of a step as opposed to the inclined bevel 50 of the embodiment shown in FIG. 3.

It will be understood that although the cut-out 50 of the embodiment of FIG. 3 is in the form of a bevel and the cut-out 50' of the embodiment of FIG. 4 is in the form of a step, other cut-outs having forms somewhat different from the bevel 50 or the step 50' may likewise be provided between the frontal portion 46, 46' and the distal portion 48, 48' of each of the worm threads. Such other forms of the cut-outs in the threads are, thus, contemplated by the present invention.

Accordingly, the principal of the present invention lies in the provision of a cut-out either in the form of the bevel 50 of the embodiment illustrated in FIG. 3, or in the form of the step 50' of the embodiment illustrated in FIG. 4, or in some other similar form. The particular configuration of the bevel 50 whether it be convex or concave, or the step 50' whether its vertical and horizontal portions be convex or concave, may vary to some degree the effectiveness of the cut-out to vent fluid to the atmosphere but does not alter the principal of the invention.

In this respect, the provision of a cut-out 50, 50' in the crests of the threads defines a helical path corresponding to that of the thread flight of the worm and presents a radial clearance between the interior of the barrel in which the worm is confined and each distal portion 48, 48'. The helical path defined by the cut-out 50, 50' represents a deaerating means for venting-to-atmosphere, only unidirectionally upstream of a bore in which the worm 38, 38' is confined, fluid collected in the bore from elastomeric stock mixed by the worm. Thus, as elastomeric stock is mixed by the worm, fluid or air squeezed out of the stock will tend to collect in the cut-out 50, 50' and will reversibly in a direction upstream of the worm 38, 38', or opposite of the direction of advancement of elastomeric stock, helically exhaust from the barrel. This will insure that the elastomeric stock mixed by the worm 38, 38' is subjected to an optimum degree of "uncushioned" shearing action.

It will be understood, that the cut-out 50, 50' may be formed on substantially any type of worm, such as for example the more conventional worm 16 illustrated in FIG. 1 or for that matter the "refiner" screw 34 illustrated in FIG. 2. In the latter instance, however, the cut-out may be formed not only on the single threads 36, but likewise upon the upstream or distal crest portion of each of the paired threads 36A and 36B defined by the thread-grooves B in FIG. 2.

In order to assist the evacuation of air collected in a barrel in which the worm 38, 38' is confined, there is provided the tapered bottom 44, 44' which deepens in a direction downstream of the bore in which the worm 38, 38' is confined, namely in the direction of arrow D in FIG. 3. The more shallow upstream region of the tapered bottom 44, 44' acts to compress and deaerate the elastomeric stock, whereas the deeper downstream region of the tapered bottom 44, 44' has a lesser compression-acting capacity and thus permits the fluid deaerated from the elastomeric stock by the shallow tapered bottom region to advance downstream to the helical venting path, namely to the cut-out 50, 50'. Although the tapered bottom 44, 44' is not entirely necessary, it is preferable for purposes of assisting the cut-out 50, 50' to vent fluid collected in the worm barrel.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed:

1. In a mill for mixing and extruding elastomeric stock, said mill including a barrel having an elongate bore, and a worm rotatably supported in said bore, said worm in axial cross-section presenting helical threads and grooves alternating with one another and which are adapted to mix and advance elastomeric stock in said bore, said threads terminating in respective crests which extend adjacent to an internal surface of said barrel defining said bore, each of said crests having frontal and distal portions facing downstream and upstream of said bore, respectively, an improvement comprising deaerating means for venting-to-atmosphere only unidirectionally upstream of said bore fluid collected in the latter from elastomeric stock mixed by said worm, said deaerating means defining a helical venting path between said internal surface of said barrel and said distal portion of each of said crests, said helical venting path having a maximum radial clearance which is greater than any clearance between said internal surface of said barrel and said frontal portion of each of said crests, each of said grooves having a tapered bottom which deepens in a direction downstream of said bore, the more shallow upstream region of each said tapered bottom acting to compress and deaerate elastomeric stock, the deeper downstream region of each said tapered bottom permitting fluid deareated from the elastomeric stock to advance downstream to said helical venting path.

2. In a mill as claimed in claim 1, wherein said distal portion of each of said crests is formed with a helical cut-out which radially deepens in a direction upstream of said bore, said cut-out helically extending uniformly along said crests and cooperatively with said internal surface of said barrel defining said helical venting path.

3. In a mill as claimed in claim 2, wherein said cut-out has an extent axially of said bore which is in the range of approximately 0.25–0.50 times the thickness of said crests axially of said bore.

4. In a mill as claimed in claim 2, wherein said cut-out has a depth of at least 1.25 times greater than any clearance between said frontal portion of each of said crests and said internal surface of said barrel.

5. In a mill as claimed in claim 2, wherein said cut-out is in the form of a bevel.

6. In a mill as claimed in claim 5, wherein said bevel is inclined at an angle in the range of approximately 10°–30°.

7. In a mill as claimed in claim 2, wherein said cut-out is in the form of a step.

8. In a mill as claimed in claim 1, wherein each of said crests is substantially flat between said frontal and distal portions thereof.

9. In a mill for mixing and extruding elastomeric stock, said mill including a barrel having an elongate bore, and a worm rotatably supported in said bore, said worm in axial cross-section presenting helical threads and grooves alternating with one another and which are adapted to mix and advance elastomeric stock in said bore, said threads terminating in respective crests which extend adjacent to an internal surface of said barrel defining said bore, each of said crests having frontal and distal portions facing downstream and upstream of said bore, respectively, an improvement comprising deaerating means for venting-to-atmosphere only unidirectionally upstream of said bore fluid collected in the latter from elastomeric stock mixed by said worm, said deaerating means defining a helical venting path between said internal surface of said barrel and said distal portion of each of said crests, said helical venting path having a maximum radial clearance which is greater than any clearance between said internal surface of said barrel and said frontal portion of each of said crests, each of said grooves in succession downstream of said bore having a lesser axial extent and depth than a groove preceding it upstream of said bore, said grooves constituting a group which terminates in a groove having a substantially zero axial extent and depth, each of said threads medially of its respective crest having a conformingly helical thread groove which is greater in depth and axial extent than one preceding it upstream of said bore, said thread grooves in said crests constituting a group which initiates in one having a substantially zero axial extent and depth, the group of thread grooves in said crests overlapping the group of worm grooves.

* * * * *